United States Patent Office 3,186,907
Patented June 1, 1965

3,186,907
19-NOR-TESTOSTERONE DERIVATIVES, THEIR PROCESS OF PREPARATION AND THEIR METHOD OF UTILIZATION
Gérard Nominé, Noisy-le-sec, Robert Bucourt, Clichy-sous-Bois, and Jean Tessier, Paris, France, assignors to Roussel-UCLAF, S.A., Paris, France, a corporation of France
No Drawing. Filed Apr. 10, 1962, Ser. No. 186,341
Claims priority, application France, Apr. 14, 1961, 858,794; Aug. 11, 1961, 870,687
6 Claims. (Cl. 167—74)

The present invention relates to the preparation and use of epoxy steroids alkylated in the 2 position. It more particularly relates to 2α-lower alkyl-9α,10α-epoxy-19-nor-testosterone, ethers and esters thereof, the process of preparing these compounds and the utilization of these compounds.

An object of the present invention is the obtention of 19-nor-testosterone derivatives having the formula:

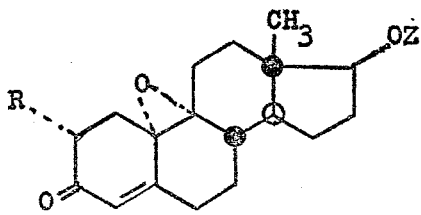

wherein R represents a lower alkyl; and Z represents a radical selected from the group consisting of hydrogen, lower alkyl and an acyl radical of an organic carboxylic acid having from 2 to 18 carbon atoms.

A further object of the invention is the development of a process for the production of the above 19-nor-testosterone derivatives.

Another object of the invention is the obtention of intermediate estradiene derivatives having the formula:

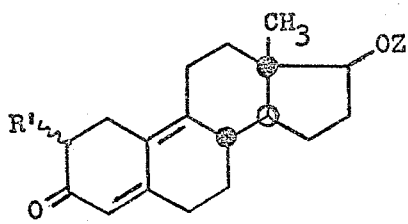

wherein R' represents a radical selected from the group consisting of α-lower alkyl and β-lower alkyl; Z represents a radical selected from the group consisting of hydrogen, lower alkyl and an acyl radical of an organic carboxylic acid having from 2 to 18 carbon atoms.

A still further object of the invention is the process of utilization of said 19-nor-testosterone derivatives for the inhibition of hypophysial activity.

These and other objects of the invention will become more apparent as the description thereof proceeds.

The new compounds of the invention have the Formula I:

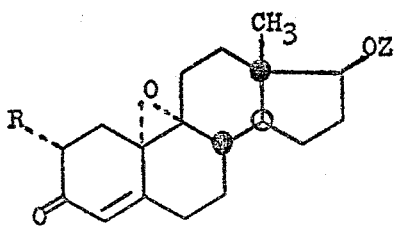

wherein R represents a lower alkyl such as methyl, ethyl, propyl, isopropyl, etc., Z represents hydrogen; an acyl radical of an organic carboxylic acid having from 2 to 18 carbon atoms; preferably a hydrocarbon carboxylic acid such as alkanoic acids, for example, acetic acid, trimethyl acetic acid; alkenoic acids; cycloalkylalkanoic acids, for example, cyclopentyl acetic acid; benzene- and naphthalene-alkanoic acids, for example, phenyl-acetic acid; benzene carboxylic acids, benzoic acid; cycloalkane carboxylic acids, for example, hexahydrobenzoic acid; etc., or a lower alkyl radical.

The compounds of the invention possess useful phyisological properties. 2α-methyl-9α,10α-epoxy-19-nor-testosterone possesses particularly an inhibiting action on hypophysis. It can be utilized for the treatment of excesses of hypophysial overstressing of the F.S.H. factor (folliculo-stimulating gonadotropic hormone) caused by castration or by menopause. Of course the esters and ethers of 2α-methyl-9α,10α-epoxy-19-nor-testosterone are also useful for the same purpose.

The process of producing the said 19-nor-testosterone derivatives having the formula:

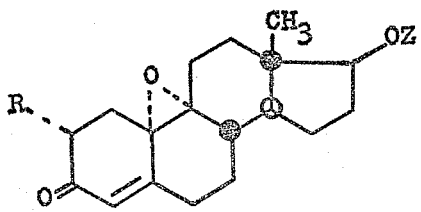

wherein R represents a lower alkyl; and Z represents a radical selected from the group consisting of hydrogen, lower alkyl and an acyl radical of an organic carboxylic acid having from 2 to 18 carbon atoms, comprises the steps of subjecting a compound having the formula:

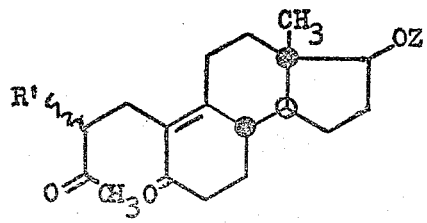

wherein R' represents a radical selected from the group consisting of α-lower alkyl and β-lower alkyl and Z has the above-assigned meaning, to the action of a basic cyclization agent in an anhydrous inert organic solvent, separating the estradiene having the formula:

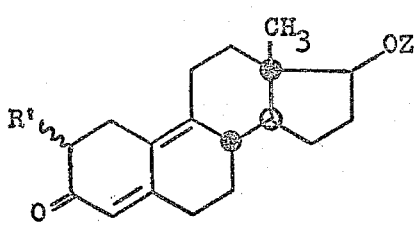

wherein R' and Z have the above-assigned meanings, into its 2α- and 2β-epimers, reacting the compound having the formula:

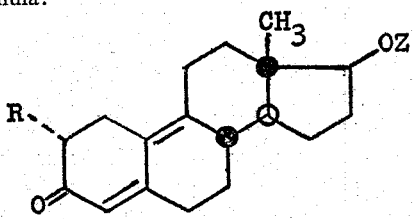

wherein R and Z have the above-assigned meanings with a peracid, and recovering said 19-nor-testosterone derivatives.

The corresponding 9α,10α-epoxy-12α-lower alkyl-19-nor-testosterone or its ester is obtained, depending upon whether the starting product is in the free base form or the esterified form. The final product can be transformed by the usual procedures into all other desired functional derivatives.

The starting compounds, the Δ⁸-3-methyl-7-oxo-8-(3'-oxo-2'-lower alkyl-butyl)-3,4-[3' - hydroxy-cyclopentano-(2',1')]-octahydronaphthalene and esters thereof, can be prepared according to the process described in our co-pending U.S. patent application Serial No. 152,180, filed November 14, 1961, now U.S. Patent No. 3,109,009. It is preferable to employ the benzoic acid ester of the methyl derivative of the above compound, which can also be designated as 17β-benzoyloxy-4,5 - seco - 2-methyl-Δ⁹-estrene-3,5-dione, as a starting compound to give the benzoic acid ester of 2α-methyl-9α,10α-epoxy-19-nor-testosterone.

For the cyclization of 4,5-seco-2-lower alkyl-Δ⁹-estrene-17β-ol-3,5-dione and esters thereof, as a basic cyclization agent, there is utilized preferably an alkaline alcoholate such as an alkali metal tert.-lower alkanolate, for example, sodium or potassium t-amylate.

The 2-lower alkyl-Δ⁴,⁹-estradiene-17β-ol-3-one and esters thereof are separated into their 2α- and 2β-epimers, preferably by subjecting them to chromatography over silica gel with elution with methylene chloride containing 0.2% acetone.

The peracid employed in the epoxidation step is preferably an organic percarboxylic acid; for example, peralkanoic acids, such as performic acid, and peracetic acid; and benzene percarboxylic acids, such as perbenzoic acid and perphthalic acid, etc.

The following examples are illustrative of the invention but are not to be deemed limitative. It is obvious that other expedients known to the art may be employed. In addition other modes of operation, such as starting with other esters in the 17β position or even the free alcohol or utilizing other 2-lower alkyl derivatives than the 2-methyl derivate, may be followed.

EXAMPLE I

*Preparation of the benzoate of 2α-methyl-9α,10α-epoxy-19-nor-testosterone*

*Step A.—Cyclization.*—5 g. of 17β - benzoyloxy - 4,5 - seco-2-methyl-Δ⁹-estrene-3,5-dione (obtained according to United States patent application Serial No. 152,180, now U.S. Patent No. 3,109,009) were dissolved in 200 cc. of anhydrous toluene. The mixture was cooled to 0° C. and 9.6 cc. of a solution of 1.3 N sodium t-amylate in toluent were added thereto. The mixture was agitated under an atmosphere of nitrogen for a period of 2 hours at 0° C. Thereafter, the reaction mixture was acidified by the addition of dilute acetic acid to a pH of 4. The solution was decanted. The organic phase was washed with water and dried over sodium sulfate. Upon evaporation to dryness under vacuum, a crystalline residue was obtained. This residue consisted of the mixture of 2α- and 2β-epimers of 17β-benzoyloxy-2-methyl-Δ⁴,⁹-estradiene-3-one. The product was separated by subjecting it to chromatography over silica gel and elution with methylene chloride containing 0.2% of acetone. This process gave the separation of the two isomers in the 2 position of 17β-benzoyloxy-2-methyl-Δ⁴,⁹-estradiene-3-one. 17β-benzoyloxy-2α-methyl-Δ⁴,⁹-estradiene-3-one was thus obtained melting at 156.5° C. and having a specific rotation [α]$_D^{20}$=−189° (c.=0.58% in methanol). This compound occurred in the form of cubic crystals, soluble in hot alcohol.

*Analysis.*—$C_{26}H_{30}O_3$; molecular weight=390.5. Calculated: C, 79.96%; H, 7.74%. Found: C, 79.7%; H, 7.7.

U.V. spectra (ethanol):

$\lambda_{max.}=229-230$ m$\mu$, $E_{1cm.}^{1\%}=484$, $\epsilon=18,900$ $\lambda_{max.}=302-303$ m$\mu$, $E_{1cm.}^{1\%}=551$, $\epsilon=21,500$ On further elution, 17β-benzoyloxy-2β-methyl-Δ⁴,⁹-estradiene-3-one was obtained melting at 140° C. and having a specific rotation [α]$_D^{20}$=+1.7° (c.=0.28% in methanol). This compound occurred in the form of needles soluble in hot alcohol.

U.V. spectra (ethanol):

$\lambda_{max.}=220-230$ m$\mu$, $E_{1cm.}^{1\%}=464$, $\epsilon=18,100$ $\lambda_{max.}=303-304$ m$\mu$, $E_{1cm.}^{1\%}=513$, $\epsilon=20,000$ 17β - benzoyloxy - 2α - methyl - Δ⁴,⁹ - estradiene - 3 - one and 17β-benzoyloxy-2β-methyl-Δ⁴,⁹-estradiene-3-one are not described in the literature.

*Sept B.—Epoxidation.*—330 mg. of 17β-benzoyloxy-2α-methyl-Δ⁴,⁹-estradiene-3-one (M.P. 156.5° C.) were introduced into 3.3 cc. of dichlorethane. 0.83 cc. of an ethereal solution containing 30% of perphthalic acid were added and the mixture formed was allowed to stand at room temperature under an atmosphere of nitrogen for a period of 20 hours. The phthalic acid formed was removed by vacuum filtration and then was washed with methylene chloride. The organic filtrates were combined, successively washed with an aqueous solution containing 1% of sodium bisulfite, with water, with a solution containing 5% of sodium bicarbonate, and again with water. Thereafter the organic solution was dried, filtered and evaporated to dryness under vacuum. The raw product was crystallized from ethanol. 280 mg. (being a yield of 81.5%) of the benzoate of 2α-methyl-9α,10α-epoxy-19-nor-testosterone were obtained having a melting point of 185° C. and a specific rotation [α]$_D^{20}$=+79.5° (c.=0.7% in 1 part of methylene chloride and 9 parts of methanol).

The product occurred in the form of white platelets, soluble in 17 volumes of alcohol at the reflux temperature.

*Analysis.*—$C_{26}H_{30}O_4$; molecular weight=406.50. Calculated: C, 76.82%; H, 7.44%. Found: C, 77.1%; H, 7.5%.

U.V. spectra (ethanol):

$\lambda_{max.}=233$ m$\mu$, $E_{1cm.}^{1\%}=584$, $\epsilon=23,750$ $\lambda_{inflection}=250$ m$\mu$, $E_{1cm.}^{1\%}=337$, $\epsilon=13,700$ This compound is not described in the literature.

2α-methyl-9α,10α-epoxy-19-nor- testosterone, its esters and ethers, can be administered by oral methods, perlingual methods, transcutaneous methods or by rectal methods.

The products can be prepared in the form of injectable solutions or injectable suspensions, prepared in ampules or in multiple-dose flasks; in the form of implants; in the form of tablets; in the form of glossettes; and in the form of suppositories:

The useful dosology is controlled between 20 and 200 mg. per day in adults as function of the method of administration.

The pharmaceutical forms, such as injectable solutions or injectable supensions, implants, glossettes, or suppositories, are prepared according to the usual processes.

EXAMPLE II

Pharmacological study (a) *Determination of the hypophysial inhibitor effect.*—From 30-day old female rats weighing between 75 and 80 g., sisters of the same litters were united 2 by 2 in parabiotic union. One of the rats in the parabiotic union was castrated and treated the same day by the medicine. The animal was treated for a period of 10 days. The animals were sacrificed the eleventh day after the parabiotic union. The genital organs were separated and weighed. In this test the castrated rats received 296γ per day of the benzoate of 2α-methyl-9α,10α-epoxy-19-nor-testosterone for a period of 10 days subcutaneously. The table below gives the results obtained with the different lots of rats:

TABLE I

|  | Mg. |
|---|---|
| Average weight of the uterus of the entire rat | 80 |
| Average weight of the uterus of the castrated rat | 88 |
| Average weight of the ovaries of the entire rat | 21 |
| Average weight of the ovaries of the castrated rats (weighed the day of castration, i.e., average weight of the ovaries at the start of the test) | 17 |

A comparison of the average weight of the ovaries of the castrated rats at the start of the experiment taken as the reference weight and the average weight of the ovaries of the entire rat at the end of the experiment shows that there has been no increase in weight of this organ.

In the control couples where the non-treated castrated subject was united parabiotically to the intact subject, the average weight of the ovaries of the intact subject by contrast was equal, at the end of the test, to 150 mg.

It can thus be concluded that the excessive hypophysial overstressing in F.S.H. factor due to the castration is totally inhibited by the benzoate of 2α-methyl-9α,10α-epoxy-19-nor-testosterone.

(b) *Determination of a possible estrogenic effect.*—Histological examination of the vaginas of the castrated females treated with the benzoate of 2α-methyl-9α,10α-epoxy-19-nor testosterone in the previous test of parabiosis showed a vaginal mucification in 75% of the cases. The product possesses thus a weak estrogenic activity.

In contrast, subcutaneous administration to castrated rats weighing about 150 g. for a period of 10 days of a daily dose of 296γ of the benzoate of 2α-methyl-9α,10α-epoxy-19-nor testosterone caused no caginal mucification.

The dose of 296γ per day can thus be considered to constitute the threshold dose for the observation of an estrogenic effect.

In addition, in the Allen and Doisy test, the single administration of 3 mg. of the benzoate of 2α-methyl-9α,10α-epoxy-19-nor-testosterone was without effect.

(c) *Determination of the androgenic and myotrophic effect.*—The daily subcutaneous administration of 296γ of benzoate of 2α-methyl-9α,10α-epoxy-19-nor-testosterone for a period of 10 days according to the Herschberger test caused no notable increase of the body weight, of the weight of the seminal vesicules, of weight of the prostate, and of the weight of levator ani, as shown by the table below:

TABLE II

|  | Body weight in grams | | Seminal vesicules in mg. | Prostate in mg. | Levator ani in mg. |
|---|---|---|---|---|---|
|  | Before | After |  |  |  |
| Control | 46 | 87 | 5.1 | 8.2 | 16.4 |
| Treated | 45 | 70 | 6.3 | 8.9 | 12 |

From this test the absence of an androgenic activity and an anabolic activity can be concluded.

(d) *Determination of an antilipemic effect.*—Two lots of dogs received an excess of fresh cream in an amount of 10 g. per kg. of weight. At the same time, in one of the lots, 4 mg. per kg. of the benzoate of 2α-methyl-9α,10α-epoxy-19-nor-testosterone were injected subcutaneously. The other lot received only an equal volume of solvent.

The samples of the blood of the animals were taken over citrate before the injection of the fresh cream, then three hours, five hours and seven hours after the injection. The plasmatic turbidity was read on the Verne photometer after centrifuging the blood.

TABLE III
[Plasmatic turbidity expressed in optical density]

| Lots | Time after ingestion of cream | | | |
|---|---|---|---|---|
|  | 0 | 3 hours | 5 hours | 7 hours |
| Control | 0.43 | 1.41 | 0.75 | 0.43 |
| Benzoate of 2α-methyl-9α,10α-epoxy-19-nor-testosterone | 0.71 | 1.10 | 0.76 | 0.52 |

At the dose of 4 mg. per kg. utilized, the benzoate of 2α-methyl-9α,10α-epoxy-19-nor-testosterone exercised an antilipemic effect persisting more than 7 hours after the injection.

The preceding examples are not to be construed as limiting the invention. It is obvious to one skilled in the art that temperatures, the nature of the solvents, the organic carboxylic acid ester or the utilization of other esters, ethers or the free alcohol, 2α-methyl-9α,10α-epoxy-19-nor-testosterone, may be varied or that equivalent techniques may be employed without departing from the spirit of the invention or the scope of the appended claims.

We claim:

1. The process of preparing 19-nor-testosterone derivatives having the formula:

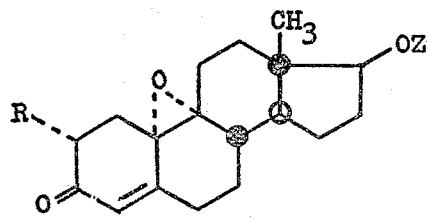

wherein R represents a lower alkyl; and Z represents a radical selected from the group consisting of hydrogen, lower alkyl and an acyl radical of an organic carboxylic acid having from 2 to 18 carbon atoms, which comprises the steps of subjecting a compound having the formula:

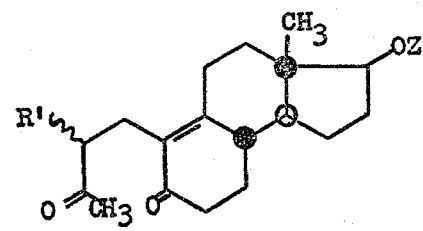

wherein R' represents a radical selected from the group consisting of α-lower alkyl and β-lower alkyl and Z has the above-assigned meaning, to the action of a basic cyclization agent in an anhydrous inert organic solvent, separating the estradiene having the formula:

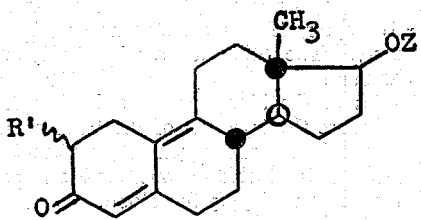

wherein R' and Z have the above-assigned meanings into its 2α- and 2β-epimers, reacting the compound having the formula:

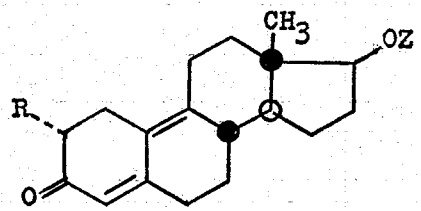

wherein R and Z have the above-assigned meanings with a peracid, and recovering said 19-nor-testosterone derivatives.

2. The process of claim 1 wherein said basic cyclization agent is an alkaline alcoholate.

3. The process of claim 2 wherein said alkaline alcoholate is sodium t.-amylate.

4. The process of claim 1 wherein said peracid is perphthalic acid.

5. The process of preparing the benzoate of 2α-methyl-9α,10α-epoxy-19α-nor-testosterone which comprises the steps of reacting 17β-benzoyloxy-4,5-seco-2-methyl-Δ$^9$-estrene-3,5-dione with an alkali metal tert.-lower alkanolate in the presence of an anhydrous inert organic solvent, subjecting the 17β-benzoyloxy-2-methyl-Δ$^{4,9}$-estradiene-3-one to chromatography to separate the 2α- and 2β-epimers, reacting the 17β-benzoyloxy-2α-methyl-Δ$^{4,9}$-estradiene-3-one with an organic percarboxylic acid and recovering said benzoate of 2α-methyl-9α,10α-epoxy-19-nor-testosterone.

6. The method of inhibiting excessive hypophysial overstressing in warm blooded animals which comprises administering a safe but effective amount of a 19-nor-testosterone derivative having the formula:

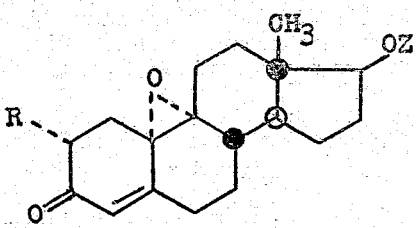

wherein R represents a lower alkyl; and Z represents a radical selected from the group consisting of hydrogen, lower alkyl and an acyl radical of an organic carboxylic acid having from 2 to 18 carbon atoms.

References Cited by the Examiner
UNITED STATES PATENTS

| | | | |
|---|---|---|---|
| 3,020,296 | 2/62 | Nominé et al. | 260—397.45 |
| 3,055,885 | 9/62 | Nominé et al. | 260—239.5 |
| 3,056,811 | 10/62 | Nominé et al. | 260—237.5 |

OTHER REFERENCES

Ayphassorho et al.: Compt. Rend. Akad. Sci., volume 253, pages 684–687 (July 24, 1961).

Legrand et al.: Compt. Rend. Akad. Sci., volume 253, No. 21, pages 2378–2380 (November 1, 1961).

Velluz et al.: Compt. Rend. Akad. Sci., volume 252, No. 25, 3903–3905 (June 1961).

LEWIS GOTTS, *Primary Examiner.*